United States Patent
Aoki et al.

(10) Patent No.: US 10,023,754 B2
(45) Date of Patent: Jul. 17, 2018

(54) METALLIC INK COMPOSITION FOR INKJET PRINTING FOR POLYVINYL CHLORIDE SUBSTRATE

(71) Applicant: DAI NIPPON TORYO CO., LTD., Osaka (JP)

(72) Inventors: Keita Aoki, Tochigi (JP); Seiji Hamanaka, Tochigi (JP); Hiroki Hayashi, Tochigi (JP); Akira Iwasawa, Tochigi (JP)

(73) Assignee: DAI NIPPON TORYO CO., LTD., Osaka (JP)

( * ) Notice: Subject to any disclaimer, the term of this patent is extended or adjusted under 35 U.S.C. 154(b) by 31 days.

(21) Appl. No.: 15/025,979

(22) PCT Filed: Sep. 30, 2014

(86) PCT No.: PCT/JP2014/076002
§ 371 (c)(1),
(2) Date: Mar. 30, 2016

(87) PCT Pub. No.: WO2015/046555
PCT Pub. Date: Apr. 2, 2015

(65) Prior Publication Data
US 2016/0244627 A1  Aug. 25, 2016

(30) Foreign Application Priority Data
Sep. 30, 2013  (JP) ................................. 2013-204431

(51) Int. Cl.
| | |
|---|---|
| C08G 18/42 | (2006.01) |
| C08L 51/00 | (2006.01) |
| C08L 67/00 | (2006.01) |
| C09D 11/322 | (2014.01) |
| C09D 11/36 | (2014.01) |
| C09D 11/104 | (2014.01) |
| B41M 5/00 | (2006.01) |

(52) U.S. Cl.
CPC .......... *C09D 11/322* (2013.01); *C09D 11/104* (2013.01); *C09D 11/36* (2013.01); *B41M 5/0047* (2013.01); *B41M 5/0064* (2013.01)

(58) Field of Classification Search
None
See application file for complete search history.

(56) References Cited

U.S. PATENT DOCUMENTS

| | | | | |
|---|---|---|---|---|
| 5,624,076 | A * | 4/1997 | Miekka | B22F 1/0007 164/46 |
| 8,389,601 | B2 | 3/2013 | Kim et al. | |
| 2002/0017219 | A1* | 2/2002 | Yamazaki | C09D 11/32 106/31.68 |
| 2005/0256226 | A1* | 11/2005 | Thetford | B01F 17/0064 523/161 |
| 2009/0099332 | A1* | 4/2009 | Glockner | C08G 6/02 528/223 |
| 2011/0014440 | A1* | 1/2011 | Itano | C09D 11/322 428/207 |
| 2011/0040014 | A1 | 2/2011 | Kim et al. | |
| 2015/0038620 | A1* | 2/2015 | Lavalaye | C09D 5/36 524/39 |

FOREIGN PATENT DOCUMENTS

| | | |
|---|---|---|
| JP | 2005-015671 | 1/2005 |
| JP | 2008-247966 | 10/2008 |
| JP | 2011-038067 | 2/2011 |
| JP | 2011-052107 | 3/2011 |
| JP | 2011-149028 | 8/2011 |
| JP | 2012-102310 | 5/2012 |
| JP | 2012-219203 | 11/2012 |
| JP | 2013-023562 | 2/2013 |
| WO | WO 2005-085369 | 9/2005 |

OTHER PUBLICATIONS

Machine Translation of JP 2008-247966, Oct. 16, 2008, p. 1-18.*
International Search Report, PCT/JP2014/076002, dated Dec. 9, 2014.

* cited by examiner

*Primary Examiner* — Robert T Butcher
(74) *Attorney, Agent, or Firm* — Young & Thompson

(57) ABSTRACT

A metallic ink composition for inkjet printing for a polyvinyl chloride substrate, can form printed matter having superior mirror gloss and favorable scratch resistance, and is able to prevent nozzle clogging during inkjet printing, and more specifically pertains to a metallic ink composition that is for inkjet printing for a polyvinyl chloride substrate and that is characterized by containing at least a polyester resin (a) having a weight average molecular weight of no greater than 12,000, a metallic pigment dispersion (b) resulting from dispersing a evaporated aluminum pigment only in an organic solvent, and an organic solvent (c) that has solubility with respect to the polyvinyl chloride substrate.

6 Claims, No Drawings

METALLIC INK COMPOSITION FOR INKJET PRINTING FOR POLYVINYL CHLORIDE SUBSTRATE

BACKGROUND OF THE INVENTION

The present invention relates to a metallic ink composition for inkjet printing for a polyvinyl chloride substrate, and more particularly relates to a metallic ink composition for inkjet printing for a polyvinyl chloride substrate that can prevent nozzle clogging at the time of inkjet printing and that can form a printed product whose scratch resistance is satisfactory and whose mirror gloss is excellent. The metallic ink composition for inkjet printing for a polyvinyl chloride substrate refers to an ink composition that can be used for printing on a polyvinyl chloride substrate using an inkjet printer among ink compositions containing a metallic pigment.

Conventionally, in order to express a design excellent in metallic gloss on a recording product where an image or the like is printed, a bright material is used in an ink forming an image or a thermal transfer sheet or the like is used as a recording medium.

It is known that as a result of the development of an inkjet printing technology in recent years, even in the printing of an image on a recording medium such as a polyvinyl substrate used for outdoor advertising or the like, a metallic ink composition containing an aluminum pigment or a pearl pigment is used, and thus it is possible to obtain a recording product having a metallic gloss (for example, Patent Document 1).

Patent Document 1: Japanese Unexamined Patent Application, Publication No. 2011-149028

SUMMARY OF THE INVENTION

However, when the amount of resin component is increased in order to enhance the film performance of the metallic ink composition, since a metallic pigment (in particular, an aluminum pigment) in the metallic ink composition is flocculated, nozzle clogging is produced at the time of inkjet printing or the metallic gloss of a recording product is lowered. Hence, in a metallic ink composition for inkjet printing for a polyvinyl chloride substrate, only a small amount of resin can be mixed, and thus film performance such as scratch resistance and weatherability is degraded.

Hence, an object of the present invention is to provide a metallic ink composition for inkjet printing for a polyvinyl chloride substrate that solves the problem in the conventional technology described above, that can prevent nozzle clogging at the time of inkjet printing and that can form a printed product whose scratch resistance is satisfactory and whose mirror gloss is excellent.

Means for Solving the Problems

In order to achieve the object described above, the present inventor has performed thorough examinations to find that even when a large amount of resin is mixed, when a polyester resin having a specific weight average molecular weight and a specific evaporated aluminum pigment dispersion member are combined, sit is possible to prevent the flocculation of an aluminum pigment, with the result that the present invention is completed.

Specifically, according to the present invention, there is provided a metallic ink composition for inkjet printing for a polyvinyl chloride substrate, the metallic ink composition containing at least: a polyester resin (a) having a weight average molecular weight of 12,000 or less; a metallic pigment dispersion member (b) formed by dispersing an evaporated aluminum pigment in only an organic solvent; and an organic solvent (c) permeable to a polyvinyl chloride substrate.

In a preferred example of the metallic ink composition for inkjet printing for a polyvinyl chloride substrate according to the present invention, the metallic ink composition further contains 0.1 to 2.0 mass % of a phosphate copolymer.

In another preferred example of the metallic ink composition for inkjet printing for a polyvinyl chloride substrate according to the present invention, the polyester resin (a) has an acid value of 5 to 50.

In another preferred example of the metallic ink composition for inkjet printing for a polyvinyl chloride substrate according to the present invention, the metallic ink composition further contains 0.01 to 0.30 mass % of an ultraviolet absorption agent.

In another preferred example of the metallic ink composition for inkjet printing for a polyvinyl chloride substrate according to the present invention, the metallic ink composition further contains 0.1 to 5.0 mass % of a phenyl group-containing ketone resin having a weight average molecular weight of 2,000 or less.

In another preferred example of the metallic ink composition for inkjet printing for a polyvinyl chloride substrate according to the present invention, the metallic pigment dispersion member (b) is obtained by performing natural filtration with a twilled dutch weave mesh serving as a filter.

Effects of the Invention

In the present invention, a polyester resin having a specific weight average molecular weight and a specific evaporated aluminum pigment dispersion member are combined, and thus it is possible to provide a metallic ink composition for inkjet printing for a polyvinyl chloride substrate that can prevent nozzle clogging at the time of inkjet printing and that can form a printed product whose scratch resistance is satisfactory and whose mirror gloss is excellent.

DESCRIPTION OF THE PREFERRED EMBODIMENTS

A metallic ink composition for inkjet printing for a polyvinyl chloride substrate according to the present invention (hereinafter also simply referred to as a metallic ink composition of the present invention) will be described in detail below. The metallic ink composition of the present invention includes at least a polyester resin (a) that has a weight average molecular weight of 12,000 or less, a metallic pigment dispersion member (b) that is formed by dispersing an evaporated aluminum pigment in only an organic solvent and an organic solvent (c) that is permeable to a polyvinyl chloride substrate.

The polyester resin (a) used in the metallic ink composition of the present invention can enhance the scratch resistance of a printed product. The polyester resin (a) needs to have a weight average molecular weight of 12,000 or less, and the weight average molecular weight is preferably 6,000 or less. When the weight average molecular weight of the polyester resin (a) is 12,000 or less, the evaporated aluminum pigment forming the metallic pigment dispersion member (b) is prevented from being flocculated in the metallic ink composition of the present invention, and thus it is possible to prevent nozzle clogging at the time of inkjet printing. When the evaporated aluminum pigment is flocculated, a metallic gloss derived from the evaporated aluminum pigment is lowered. Since the polyester resin (a) forms the resin base material of the printed product, its weight average molecular weight is preferably 3,000 or more. In the present invention, the weight average molecular weight is a value that is measured by gel filtration chromatography, and as a standard substance, a polystyrene is used.

The acid value of the polyester resin (a) is preferably 5 to 50. When the acid value of the polyester resin (a) falls within a range of 5 to 50, an acid radical in the polyester resin (a) reacts with the surface of the evaporated aluminum pigment, and the evaporated aluminum pigment is more immobilized, with the result that the scratch resistance can be further enhanced and wettability on the evaporated aluminum pigment is more satisfactory. When the acid value of the polyester resin (a) exceeds 50, film properties such as weatherability may be lowered.

The polyester resin (a) is a copolymer that can be obtained by subjecting a polyvalent carboxylic acid which is a monomer and a polyalcohol to dehydration polycondensation by a normal method, and a desired weight average molecular weight can be obtained by adjusting the type of monomer and the amount of monomer used.

The polyvalent carboxylic acid is a carboxylic acid that has two or more carboxyl groups. Specific examples thereof can include fumaric acid, maleic acid, itaconic acid, orthophthalic acid, isophthalic acid, terephthalic acid, oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexanedicarboxylic acid, 1,3-cyclohexanedicarboxylic acid and 1,4-cyclohexanedicarboxylic acid. These polyvalent carboxylic acids may be used singly or may be used by combining two or more types.

The polyalcohol is an alcohol that has two or more hydroxyl groups (—OH groups). Specific examples thereof can include ethylene glycol, 1,2-propylene glycol, 1,3-propylene glycol, diethylene glycol, triethylene glycol, dipropylene glycol, tripropylene glycol, 1,2-butylene glycol, 1,3-butylene glycol, 2,3-butylene glycol, 1,4-butylene glycol, 1,5-pentanediol, neopentyl glycol, butyl ethyl propanediol, 1,6-hexanediol, 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecanediol, polyethylene glycol, polytrimethylene glycol and polytetramethylene glycol. These polyalcohols may be used singly or may be used by combining two or more types.

In the metallic ink composition of the present invention, even when the amount of polyester resin (a) contained is, for example, 3.0 mass % or more, the evaporated aluminum pigment is prevented from being flocculated in the metallic ink composition of the present invention, and thus it is possible to prevent the nozzle clogging at the time of inkjet printing. However, in terms of excellent metallic gloss, the amount of polyester resin (a) contained is preferably 15.0 mass % or less and is more preferably 10.0 mass % or less. On the other hand, in the metallic ink composition of the present invention, in terms of enhancing the scratch resistance of a printed product, the amount of polyester resin (a) contained is preferably 3.0 mass % or more and is more preferably 5.0 mass % or more.

The metallic pigment dispersion member (b) used in the metallic ink composition of the present invention is formed by dispersing the evaporated aluminum pigment in only the organic solvent, and is an heterogeneous system in which the evaporated aluminum pigment is distributed in the organic solvent. A method of preparing the metallic pigment dispersion member (a) is not particularly limited, and for example, a method of adding the evaporated aluminum pigment to the organic solvent and mixing them under agitation can be used. As the metallic pigment dispersion member (b), a commercially available product can be desirably used. In the metallic pigment dispersion member (b), the amount of evaporated aluminum pigment contained is preferably 5 to 20 mass %.

In the metallic pigment dispersion member (b), since the wettability of the polyester resin (a) on the evaporated aluminum pigment is satisfactory, the flocculation of the evaporated aluminum pigment is prevented, and thus it is possible to provide a printed product which has an excellent metallic gloss.

Furthermore, as the metallic pigment dispersion member (b), a product obtained by performing natural filtration with a twilled dutch weave mesh serving as a filter is preferably used. The natural filtration is performed using the twilled dutch weave mesh, and thus it is possible to more reliably prevent the nozzle clogging at the time of inkjet printing. As the twilled dutch weave mesh, in terms of more decreasing the particle diameter of the evaporated aluminum pigment in the dispersion member (b), a twilled dutch weave mesh formed of stainless steel or iron having a wire diameter of 0.02 to 0.07 mm is preferably used. Specifically, a twilled dutch weave mesh of #3600 to #2300 mesh according to JIS standard (JIS Z8801) is particularly used.

The evaporated aluminum pigment forming the metallic pigment dispersion member (b) is an aluminum pigment that has a thin flat shape like foil, and the surface of the particles of the aluminum pigment is extremely smoothed by a production method utilizing evaporation as compared with a normal aluminum pigment, with the result that the diffused reflection of light is reduced to obtain a high brightness. A normal aluminum pigment is manufactured by stretching, with a ball mill or the like, an aluminum ingot into a thin shape, the particle of the pigment is thicker than the evaporated aluminum pigment and the surface of the particle is rough.

As the medium forming the metallic pigment dispersion member (b), only an organic solvent is used partly because it is possible to prevent the use of a dispersion agent and it is possible to prevent the amount of dispersion agent in the final metallic ink composition from being excessively increased. The organic solvent used in the metallic pigment dispersion member (b) is not particularly limited but in terms of acquiring satisfactory wettability of the organic solvent on the evaporated aluminum pigment and stably maintaining the dispersion of the pigment, glycol ether and the like are preferable. Examples thereof include ethylene glycol diethyl ether, propylene glycol diethyl ether, diethylene glycol dibutyl ether, diethylene glycol butyl methyl ether, diethylene glycol diethyl ether, diethylene glycol ethyl methyl ether, diethylene glycol isopropyl methyl ether, diethylene glycol dimethyl ether, dipropylene glycol dimethyl ether, triethylene glycol butyl methyl ether, triethylene glycol dimethyl ether, tripropylene glycol dimethyl ether, tetraethylene glycol dimethyl ether, ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol-n- propyl ether, triethylene glycol monomethyl ether, triethylene glycol monoethyl ether, triethylene glycol monobutyl ether and tripropylene glycol monomethyl ether. These organic solvents may be used singly or may be used by combining two or more types.

In the metallic ink composition of the present invention, the amount of evaporated aluminum pigment contained is preferably 0.5 to 5.0 mass %.

The organic solvent (c) used in the metallic ink composition of the present invention is an organic solvent other than the organic solvent forming the metallic pigment dispersion member (b). The organic solvent (c) and the organic solvent forming the metallic pigment dispersion member (b) may be the same as or different from each other. Since the organic solvent (c) is permeable to the polyvinyl chloride substrate, the organic solvent (c) has an excellent property of drying the metallic ink composition on the polyvinyl chloride substrate, and it is possible to control bleeding on the polyvinyl chloride substrate. The organic solvent (c) is not particularly limited as long as it is permeable to the polyvinyl chloride substrate but an organic solvent that is compatible with the organic solvent used in the preparation of the metallic pigment dispersion member is preferable, and for example, glycol ether and the like is preferable. Specific examples thereof include ethylene glycol diethyl ether, propylene glycol diethyl ether, diethylene glycol dibutyl ether, diethylene glycol butyl methyl ether, diethylene glycol diethyl ether, diethylene glycol ethyl methyl ether, diethylene glycol isopropyl methyl ether, diethylene glycol dimethyl ether, dipropylene glycol dimethyl ether, triethylene glycol butyl methyl ether, triethylene glycol dimethyl ether, tripropylene glycol dimethyl ether, tetraethylene glycol dimethyl ether, ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol-n-propyl ether, triethylene glycol monomethyl ether, triethylene glycol monoethyl ether, triethylene glycol monobutyl ether and tripropylene glycol monomethyl ether. These organic solvents (c) may be used singly or may be used by combining two or more types. In the metallic ink composition of the present invention, the amount of organic solvent (c) contained is preferably 75 to 95 mass %.

In terms of enhancing the dispersion of the pigment and the mirror gloss of a printed product, the metallic ink composition of the present invention preferably further contains a dispersion agent, and as the dispersion agent, a phosphoric acid-based dispersion agent is preferable, and a phosphate copolymer is particularly preferable. In the metallic ink composition of the present invention, the amount of dispersion agent contained is preferably 0.1 to 2.0 mass %. When the amount of dispersion agent contained exceeds 2.0 mass %, since an excessive amount of dispersion agent is floated to the surface of an ink film, the mirror gloss may be lowered. The phosphate copolymer refers to a copolymer of a phosphate ester.

In terms of enhancing the weatherability, the metallic ink composition of the present invention preferably further contains an ultraviolet absorption agent. As the ultraviolet absorption agent, a commercially available product can be desirably used. Examples thereof can include TINUVIN 1130, TINUVIN 384-2, TINUVIN 400, TINUVIN 477, TINUVIN 479 and TINUVIN 109 (made by BASF Corporation). In the metallic ink composition of the present invention, the amount of ultraviolet absorption agent contained is preferably 0.01 to 0.30 mass %.

The metallic ink composition of the present invention may further contain a low molecular-weight resin (except the polyester resin (a)) that is excellent in weatherability such as water resistance. In this way, it is possible to enhance the weatherability while maintaining the mirror gloss. Examples of the low molecular-weight resin can desirably include a phenyl group-containing ketone resin having, for example, a weight average molecular weight of 2,000 or less and preferably a weight average molecular weight of 1,000 to 2,000. In the metallic ink composition of the present invention, the amount of low molecular-weight resin contained is preferably 0.1 to 5.0 mass %. When the amount of low molecular-weight resin contained exceeds 5.0 mass %, since the wettability of the polyester resin (a) on the evaporated aluminum pigment is inhibited, the mirror gloss may be lowered.

In the metallic ink composition of the present invention, an additive that is normally used in an ink industry, such as a plasticizer, a surface modifier, a light stabilizer or an antioxidant may be selected and mixed as necessary as long as it does not harm the object of the current invention.

The metallic ink composition of the present invention can be prepared by mixing the polyester resin (a), the metallic pigment dispersion member (b), the organic solvent (c) and various types of components that are selected as necessary and using, as necessary, a filter having a pore size equal to or less than about one tenth of the nozzle diameter of an inkjet print head used to filter the obtained mixture.

As with a normal inkjet printing ink composition, the metallic ink composition of the present invention desirably has characteristics appropriate for printing with an inkjet printer, and for example, its viscosity is preferably 2.0 to 6.0 mPa·s (25° C.), and its specific gravity is preferably 0.8 to 1.2.

The metallic ink composition of the present invention can be used in various inkjet printers. Examples of the inkjet printer can include an inkjet printer that ejects an ink composition by a charge control method or an ink-on-demand method. The metallic ink composition of the present invention can be desirably applied to a large inkjet printer (for example, a large format inkjet printer). As a specific example, the metallic ink composition can be desirably applied to an inkjet printer that has the purpose of performing printing on an outdoor item such as a sign display.

Although as described above, the metallic ink composition of the present invention is a metallic ink composition that can be used in printing on a polyvinyl chloride substrate with an inkjet printer, the polyvinyl chloride substrate here is not particularly limited, and various shaped substrates can be selected according to the application of the polyvinyl chloride substrate. Examples of the application of the polyvinyl chloride substrate can include an outdoor item such as a sign display.

EXAMPLES

Although the present invention will be described in further detail below using examples, the present invention is not limited to the examples at all.

According to formulations described below, the ink compositions of examples 1 to 4 and comparative examples 1 to 5 were prepared. Specifically, an organic solvent and an additive selected as necessary were agitated to obtain an ink solvent, a polyester resin was added to such an ink solvent, thereafter a metallic pigment dispersion member was added, they were agitated at room temperature (23° C.) for 60 minutes and thus an ink composition was prepared. In example 2, after the preparation of the ink composition, the temperature was increased up to 60° C. and the ink composition was further agitated for 60 minutes or more while the temperature was maintained at 60° C. With respect to the synthesis of the polyester resin, 320 mass parts of isophthalic acid, 5 mass parts of maleic anhydride and 200 mass parts of neopentyl glycol were put into a flask incorporating a thermometer, an agitator, a $N_2$ inlet tube and an outflow tube with a partial condenser and a dehydration condensation reaction was performed at 240° C. until a predetermined acid value was reached, with the result that a polyester resin having an intended molecular weight was obtained. The metallic pigment dispersion member was obtained by natural filtration with a commercially available product using a filter described in the formulation.

Example 1

Metallic pigment dispersion member (evaporated aluminum pigment: 10.0 mass %, type of organic solvent: diethylene glycol ethyl methyl ether, filter: "twilled dutch weave #2300 mesh"): 12.5 mass parts
Diethylene glycol ethyl methyl ether (organic solvent (c)): 66.90 mass parts
Triethylene glycol monomethyl ether (organic solvent (c)): 20.00 mass parts
DISPERBYK-111 (dispersion agent made by BYK Co., Ltd., a copolymer containing an acid group): 0.60 mass parts
Polyester resin (acid value of 11 and weight average molecular weight in terms of polystyrene of 6,000): 1.00 mass part Example 2

Metallic pigment dispersion member (evaporated aluminum pigment: 10.0 mass %, type of organic solvent: diethylene glycol ethyl methyl ether, filter: "twilled dutch weave #2300 mesh"): 12.5 mass parts
Diethylene glycol ethyl methyl ether (organic solvent (c)): 59.40 mass parts
Triethylene glycol monomethyl ether (organic solvent (c)): 20.00 mass parts
DISPERBYK-111 (dispersion agent made by BYK Co., Ltd., a copolymer containing an acid group): 0.60 mass parts
Polyester resin (acid value of 11 and weight average molecular weight in terms of polystyrene of 6,000): 7.50 mass parts Example 3

Metallic pigment dispersion member (evaporated aluminum pigment: 10.0 mass %, type of organic solvent: diethylene glycol ethyl methyl ether, filter: "twilled dutch weave #2300 mesh"): 12.5 mass parts
Diethylene glycol ethyl methyl ether (organic solvent (c)): 59.33 mass parts
Triethylene glycol monomethyl ether (organic solvent (c)): 20.00 mass parts
DISPERBYK-111 (dispersion agent made by BYK Co., Ltd., a copolymer containing an acid group): 0.60 mass parts
Polyester resin (acid value of 11 and weight average molecular weight in terms of polystyrene of 6,000): 7.50 mass parts
TINUVIN 479 (triazine-based ultraviolet absorption agent made by BASF Co., Ltd.): 0.07 mass parts Example 4

Metallic pigment dispersion member (evaporated aluminum pigment: 10.0 mass %, type of organic solvent: diethylene glycol ethyl methyl ether, filter: "twilled dutch weave #2300 mesh"): 12.5 mass parts
Diethylene glycol ethyl methyl ether (organic solvent (c)): 60.58 mass parts
Triethylene glycol monomethyl ether (organic solvent (c)): 20.00 mass parts
DISPERBYK-111 (dispersion agent made by BYK Co., Ltd., a copolymer containing an acid group): 0.60 mass parts
Polyester resin (acid value of 11 and weight average molecular weight in terms of polystyrene of 6,000): 4.17 mass parts
Phenyl group-containing ketone resin (made by Evonik Tego Co., Ltd., weight average molecular weight in terms of polystyrene of 1,500): 2.08 mass parts
TINUVIN 479 (triazine-based ultraviolet absorption agent made by BASF Co., Ltd.): 0.07 mass parts Comparative Example 1

Metallic pigment dispersion member (evaporated aluminum pigment: 10.0 mass %, type of organic solvent: diethylene glycol ethyl methyl ether, filter: "twilled dutch weave #2300 mesh"): 10.00 mass parts
Diethylene glycol ethyl methyl ether (organic solvent (c)): 89.52 mass parts
DISPERBYK-111 (dispersion agent made by BYK Co., Ltd., a copolymer containing an acid group): 0.48 mass parts Comparative Example 2

Metallic pigment dispersion member (evaporated aluminum pigment: 10.0 mass %, type of organic solvent: diethylene glycol ethyl methyl ether, filter: "twilled dutch weave #2300 mesh"): 10.00 mass parts
Diethylene glycol ethyl methyl ether (organic solvent (c)): 88.52 mass parts
DISPERBYK-111 (dispersion agent made by BYK Co., Ltd., a copolymer containing an acid group): 0.48 mass parts
Polyester resin (acid value of 3 and weight average molecular weight in terms of polystyrene of 23,000): 1.00 mass part Comparative Example 3

Metallic pigment dispersion member (evaporated aluminum pigment: 10.0 mass %, type of organic solvent: diethylene glycol ethyl methyl ether, filter: "twilled dutch weave #2300 mesh"): 10.00 mass parts
Diethylene glycol ethyl methyl ether (organic solvent (c)): 88.52 mass parts
DISPERBYK-111 (dispersion agent made by BYK Co., Ltd., a copolymer containing an acid group): 0.48 mass parts Polyester resin (acid value of 4 and weight average molecular weight in terms of polystyrene of 16,000): 1.00 mass part Comparative Example 4

Metallic pigment dispersion member (evaporated aluminum pigment: 10.0 mass %, type of organic solvent: diethylene glycol ethyl methyl ether, filter: "twilled dutch weave #2300 mesh"): 10.00 mass parts
Diethylene glycol ethyl methyl ether (organic solvent (c)): 88.52 mass parts
DISPERBYK-111 (dispersion agent made by BYK Co., Ltd., a copolymer containing an acid group): 0.48 mass parts
Vinyl chloride-vinyl acetate copolymer resin (product name: SOLBIN CNL, made by Shin-Etsu Chemical Co., Ltd., weight average molecular weight in terms of polystyrene of 12,000): 1.00 mass part Comparative Example 5

Metallic pigment dispersion member (evaporated aluminum pigment: 10.0 mass %, type of organic solvent: diethylene glycol ethyl methyl ether, filter: "twilled dutch weave #1400 mesh"): 12.5 mass parts
Diethylene glycol ethyl methyl ether (organic solvent (c)): 65.90 mass parts
Triethylene glycol monomethyl ether (organic solvent (c)): 20.00 mass parts
DISPERBYK-111 (dispersion agent made by BYK Co., Ltd., a copolymer containing an acid group): 0.60 mass parts Polyester resin (acid value of 3 and weight average molecular weight in terms of polystyrene of 23,000): 1.00 mass part Then, with a large format inkjet printer (head nozzle diameter of 30 μm, filter #2300 mesh within the head), on a polyvinyl chloride substrate (PVC100MP made by LINTEC Corporation), the ink composition described above was printed, and the mirror gloss, the scratch resistance and the weatherability of the obtained recording product were evaluated by the following method. The results are shown in table 1. In comparative example 5, nozzle clogging was produced, and it was impossible to perform the printing.

<Mirror Gloss>

A micro tri-gloss meter made by BYK gardner Co., Ltd. was used to measure glossiness at 20°, 60° and 85°.

<Scratch Resistance>

Under conditions of a load of 250 gram weight, a width of 5 cm and 10 round trip, the product printed on the recording product was scrubbed with a cotton swab, the printed product was visually checked and thus the scratch resistance was evaluated according to the following criteria.
⊚: No change in the printed product was produced.
○: A slight change in the gloss of the printed product was produced.
Δ: A change in the gloss of the printed product was produced, and its basic material (polyvinyl chloride substrate) was slightly exposed.
x: The printed product was cut away with the cotton swab, and the basic material (polyvinyl chloride substrate) was exposed.

<Weatherability>

An accelerated weathering tester, Super UV tester (Eye Super UV tester W-type SUV-W23 made by Iwasaki Electric Co., Ltd.) was used to perform a weatherability test under the following conditions. The printed product after the test was visually checked, and thus the weatherability was evaluated according to the following criteria.

1) Conditions
Light source: Water-cooled metal halide lamp
Illuminance: 100 mW/cm$^2$
Wavelength: 295 to 450 nm
Temperature: 60° C. (Irradiation), 30° C. (dew condensation)
Humidity: 50% (Irradiation), 90% (dew condensation)
Cycle: Irradiation for 6 hours, dew condensation for 2 hours
Shower: 30 seconds before and after dew condensation
Test time: 50 hours 2) Criteria
⊚: No change in the printed product was produced
○: A slight change in the gloss of the printed product was produced.
Δ: A slight change in the gloss and color of the printed product was produced.
x: A remarkable change in the gloss and color of the printed product was produced.

TABLE 1

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Glossiness | 20° | 343 | 400 | 386 | 357 | 452 | 46 | 101 | 41 | Unprintable |
|  | 60° | 457 | 393 | 418 | 418 | 493 | 200 | 216 | 150 |  |
|  | 85° | 117 | 117 | 119 | 120 | 121 | 106 | 105 | 102 |  |
| Scratch resistance | | ○ | ⊚ | ⊚ | ⊚ | X | Δ | Δ | Δ |  |
| Weatherability | | Δ | Δ | ○ | ⊚ | Δ | X | X | ○ |  |

It is found from table 1 that in the ink compositions of examples 1 to 4, the printed products having an excellent metallic gloss and scratch resistance were able to be formed by combination of the polyester resin (a) and the metallic pigment dispersion member (b). It is also found that the ink composition of example 3 contained the ultraviolet absorption agent, and the ink composition of example 4 contained the phenyl group-containing ketone resin having a weight average molecular weight of 1,500, thus the weatherability was enhanced. On the other hand, in the ink composition of comparative example 1, the polyester resin was not used, and the scratch resistance was degraded. It can be found that in the ink compositions of comparative examples 2 and 3, the weight average molecular weight of the polyester resin exceeded 12,000, and the glossiness was lowered. It can be found that in the ink composition of comparative example 4, since not the polyester resin (a) but vinyl chloride-vinyl acetate copolymer resin having a weight average molecular weight of 10,000 was contained, it was impossible to sufficiently acquire the scratch resistance, and the glossiness was lowered.

What is claimed is:

1. A metallic ink composition for inkjet printing a polyvinyl chloride substrate, the metallic ink composition comprising at least:
   a polyester resin (a) having a weight average molecular weight of 12,000 or less and an acid value of 11 to 50, wherein an amount of polyester resin (a) is 3.0 to 15 mass %;
   a metallic pigment dispersion member (b) formed by dispersing an evaporated aluminum pigment in only an organic solvent, wherein
   the organic solvent is one or more selected from the group consisting of ethylene glycol diethyl ether, propylene glycol diethyl ether, diethylene glycol dibutyl ether, diethylene glycol butyl methyl ether, diethylene glycol diethyl ether, diethylene glycol ethyl methyl ether, diethylene glycol isopropyl methyl ether, diethylene glycol dimethyl ether, dipropylene glycol dimethyl ether, triethylene glycol butyl methyl ether, triethylene glycol dimethyl ether, tripropylene glycol dimethyl ether, tetraethylene glycol dimethyl ether, ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol-n-propyl ether, triethylene glycol monomethyl ether, triethylene glycol monoethyl ether, triethylene glycol monobutyl ether and tripropylene glycol monomethyl ether,
   wherein an amount of evaporated aluminum pigment in the metallic pigment dispersion member (b) is 5 to 20 mass %; and
   an organic solvent (c) permeable to a polyvinyl chloride substrate, wherein
   an amount of the organic solvent (c) is 75 to 95 mass %, and wherein
   the metallic ink composition comprising 0.1 to 2.0 mass % of a phosphate copolymer.

2. The metallic ink composition for inkjet printing a polyvinyl chloride substrate according to claim 1, the metallic ink composition further comprising 0.01 to 0.30 mass % of an ultraviolet absorption agent.

3. The metallic ink composition for inkjet printing a polyvinyl chloride substrate according to claim 1, the metallic ink composition further comprising 0.1 to 5.0 mass % of a phenyl group-containing ketone resin having a weight average molecular weight of 2,000 or less.

4. The metallic ink composition for inkjet printing a polyvinyl chloride substrate according to claim 1, wherein the metallic pigment dispersion member (b) is obtained by performing natural filtration with a twilled dutch weave mesh serving as a filter.

5. The metallic ink composition for inkjet printing a polyvinyl chloride substrate according to claim 1, wherein the phosphate copolymer is a phosphate ester-containing polyester dispersant.

6. The metallic ink composition for inkjet printing a polyvinyl chloride substrate according to claim 1, the metallic ink composition further comprising 0.01 to 0.30 mass % of an ultraviolet absorption agent.

* * * * *